US012727576B2

(12) United States Patent
Fang

(10) Patent No.: US 12,727,576 B2
(45) Date of Patent: Sep. 8, 2026

(54) PET EXCREMENT CLEANING DEVICE

(71) Applicant: Ningbo Jinchen Intelligent Technology Co., Ltd., Ningbo (CN)

(72) Inventor: Guanghua Fang, Ningbo (CN)

(73) Assignee: Ningbo Jinchen Intelligent Technology Co., Ltd., Ningbo (CN)

(*) Notice: Subject to any disclaimer, the term of this patent is extended or adjusted under 35 U.S.C. 154(b) by 989 days.

(21) Appl. No.: 17/973,296

(22) Filed: Oct. 25, 2022

(65) Prior Publication Data

US 2024/0081272 A1 Mar. 14, 2024

(30) Foreign Application Priority Data

Sep. 9, 2022 (CN) ........................ 202222401733.9
Sep. 9, 2022 (CN) ........................ 202222415334.8

(51) Int. Cl.
*A01K 1/01* (2006.01)

(52) U.S. Cl.
CPC .................................. *A01K 1/011* (2013.01)

(58) Field of Classification Search
CPC .... A01K 1/011; A01K 1/0114; A01K 1/0117; A01K 83/063; E01H 1/1206
See application file for complete search history.

(56) References Cited

U.S. PATENT DOCUMENTS 5,579,848 A * 12/1996 Hsu ........................ A01B 1/222 172/371
5,687,890 A * 11/1997 Wanner ................ A44B 11/005 224/163
D1,039,227 S * 8/2024 Zheng .......................... D30/162

FOREIGN PATENT DOCUMENTS

CN 113370258 A * 9/2021 .............. B25J 15/08
CN 217150040 U * 8/2022 ................ B65F 1/14

OTHER PUBLICATIONS

CN-113370258-A_translate (Year: 2021).*
CN_113370258_translate (Year: 2021).*
CN_217150040_U_translate (Year: 2022).*

* cited by examiner

*Primary Examiner* — Gene O Crawford
*Assistant Examiner* — Rehman A Qureshi

(57) ABSTRACT

The present disclosure relates to the technical field of pet excrement cleaning, and discloses a pet excrement cleaning device. The pet excrement cleaning device comprises an inner sleeve, and an outer sleeve is provided on an outer side of the inner sleeve. In the pet excrement cleaning device, a garbage bag can be accommodated inside the inner sleeve and an inner sleeve upper cover, the garbage bag can be drawn out from a through-hole of the inner sleeve, and the inner sleeve can be pulled upward by means of a pull handle; in the process of moving, the inner sleeve and the connection rods on the outer side drive clamping jaws to turn over, achieving the clamping operation; springs are provided between the inner sleeve and the outer sleeve to reset the inner sleeve, such that the clamping jaws are always in an open state without external force.

9 Claims, 11 Drawing Sheets

PET EXCREMENT CLEANING DEVICE

CROSS-REFERENCE TO RELATED APPLICATIONS

This application claims priorities from the Chinese patent applications 202222415334.8 and 202222401733.9 filed Sep. 9, 2022, the content of which are incorporated herein in the entirety by reference.

TECHNICAL FIELD

The present disclosure relates to the technical field of pet excrement cleaning equipment, and specifically relates to a pet excrement cleaning device.

BACKGROUND

Pets refer to dogs, cats, and other animals which are raised or managed for the purpose of recreation and companion. Raising pets can bring us happiness as well as annoyance. When we go out with our pet, the pet often encounters excrement anywhere. At this time, pet owners need to clean the excrement in time.

Nowadays, most pet owners clean excrement by holding a garbage bag with their hands, which is uncomfortable to operate, and it is easy to cause excrement to fall off when moving. However, the existing excrement cleaning device is large in size, and needs to be always hand-held during daily walking, making it inconvenient to carry.

SUMMARY

An objective of the present disclosure is to provide a pet excrement cleaning device, so as to solve the problem in the background art that most pet owners clean excrement by holding a garbage bag with their hands, it is uncomfortable to operate, and it is easy to cause excrement to fall off when moving, however, the existing excrement cleaning device is large in size and needs to be always hand-held during daily walking, making it inconvenient to carry.

In order to achieve the described objective, the disclosure provides the following technical solution: a pet excrement cleaning device, comprising an inner sleeve, wherein an outer sleeve is provided on an outer side of the inner sleeve, guide blocks are fixedly mounted on the outer side of the inner sleeve, guide grooves are provided on an inner side of the outer sleeve, springs are sleeved inside the guide grooves, the inner sleeve is capable of moving up and down in the outer sleeve, an inner sleeve upper cover is capable of being detachably mounted on an upper end of the inner sleeve, first connection grooves are provided on an inner side of the inner sleeve, first connection blocks and a limiting ring are provided on an outer side of the inner sleeve upper cover, the inner sleeve is snap-fitted with the inner sleeve upper cover by means of first connection grooves and first connection blocks, a pull handle is fixedly mounted on an end of the inner sleeve upper cover away from the inner sleeve, first lugs are fixedly mounted on an end of the inner sleeve away from the inner sleeve upper cover, clamping jaws are rotatably mounted on inner sides of the first lugs, second lugs are fixedly mounted on an end of the outer sleeve close to the clamping jaws, connection rods are rotatably mounted on inner sides of the second lugs, the clamping jaws are rotatably connected to lower ends of the connection rods, a lift handle is mounted on an upper end of the outer sleeve, an external thread is provided on an outer side of the outer sleeve, an inner thread is provided on an inner side of the lift handle, the outer sleeve is fixedly connected to the lift handle by means of the outer thread and the inner thread, a through-hole is provided on one end of the inner sleeve close to the first lugs, and a first push block is fixedly mounted inside the inner sleeve, a second push block is fixedly mounted inside the inner sleeve upper cover, a sleeve cover is detachably mounted on a lower end of the outer sleeve, second connection grooves are provided on an inner side of the sleeve cover, and second connection blocks are fixedly provided on the outer side of the outer sleeve.

Preferably, the inner sleeve is movably connected to the inner side of the outer sleeve, there are three third guide blocks annularly arranged with respect to a center line of the inner sleeve, the guide blocks are fitted with inner sides of the guide grooves, the guide grooves and the guide blocks are in one-to-one correspondence, the inner sleeve moves along the guide grooves on the inner side of the outer sleeve by means of the guide blocks, and the springs reset the inner sleeve by means of the guide blocks.

Preferably, the first connection grooves have an L-shaped structure, there are two first connection grooves annularly arranged, the first connection blocks and the first connection grooves are snap-fitted with each other, the first connection blocks and the first connection grooves are in one-to-one correspondence, the limiting ring is located on the sides of the first connection blocks away from the inner sleeve, and the diameter of the limiting ring is larger than the inner diameter of the outer sleeve; the first connection blocks of the inner sleeve upper cover are aligned with the first connection grooves; after sleeved inside the inner sleeve, the inner sleeve upper cover is rotated to enable the first connection blocks to be snap-fitted inside the first connection grooves, so as to achieve the effect of fixing the inner sleeve and the inner sleeve upper cover, and the limiting ring achieves the effect of limiting the inner sleeve, thereby preventing same from moving out of the outer sleeve in a sliding process.

Preferably, there are six first lugs annularly arranged with respect to the center line of the inner sleeve, the clamping jaws are in one-to-one correspondence with the first lugs, the other end of each of the connection rods is rotatably connected to an inner side of a respective one of the clamping jaws, and the connection rods are in one-to-one correspondence with the clamping jaws; in the process of moving, the inner sleeve drives one end of the clamping jaws to swing around the centers of a circle of two connection holes of the connection rod, so as to achieve the gripping and unfolding actions of the clamping jaws.

Preferably, the through-hole has an oval structure, and the first push block and the second push block are respectively located at centers of a circle of the inner sleeve and the lift handle; a point-break garbage bag is put into the inner sleeve upper cover and the inside of the inner sleeve; the first push block and the second push block clamp and fix two ends of the garbage bag, and the garbage bag is drawn out through the through-hole.

Preferably, the second connection grooves have an L-shaped structure, there are three second connection grooves annularly arranged, the second connection blocks and the second connection grooves are snap-fitted with each other, the second connection blocks and the second connection grooves are in one-to-one correspondence, and the sleeve cover is located outside the clamping jaws; the second connection grooves of the sleeve cover are aligned with the second connection blocks, and after sleeved outside the outer sleeve, the sleeve cover is rotated to enable the second connection blocks to be snap-fitted inside the second connection grooves, so as to achieve the effect of fixing the sleeve cover and the outer sleeve, and the sleeve cover achieves the effect of protecting the clamping jaws and preventing the clamping jaw from being unfolded, thereby preventing excrement in the garbage bag from falling off.

Preferably, each of the clamping jaws is rotatably connected to a respective one of the first lugs by means of a pin shaft, each of the second lugs is rotatably connected to an upper end of a respective one of the connection rods by means of the pin shaft, and each of the clamping jaws is rotatably connected to a lower end of a respective one of the connection rods by means of the pin shaft.

Preferably, a round cap is provided on one end of the pin shaft, and a conical cap is provided on the other end of the pin shaft, and an elastic groove is provided on one end of the conical cap; the arrangement of the elastic groove can facilitate the insertion and mounting of the pin shaft, and the pin shaft is simple to mount and is easy to operate.

Preferably, the lower end of each of the clamping jaws is converged inward and bent; and when the clamping jaws are clamped and converged, the lower ends of the multiple clamping jaws are in a closed state, thereby preventing the clamped excrement from falling off.

Compared with the prior art, the present disclosure has the following beneficial effects:

In the pet excrement cleaning device, a garbage bag can be accommodated inside the inner sleeve and an inner sleeve upper cover, the garbage bag can be drawn out from a through-hole of the inner sleeve, and the inner sleeve can be pulled upward by means of a pull handle so as to move on the inner side of the outer sleeve; clamping jaws are provided on the lower end of the outer side of the outer sleeve, and connection rods are rotatably mounted on the inner side of second lugs; by providing the connection rods, when the inner sleeve is pressed downward, the clamping jaws have a larger opening angle, so that the apparatus can pick up larger excrement; in the process of moving, the inner sleeve and the connection rods of the outer side drive clamping jaws to turn over, achieving the clamping operation; springs are provided between the inner sleeve and the outer sleeve to reset the inner sleeve, such that the clamping jaws are always in an open state without external force; the garbage bag is sleeved outside the clamping jaws to wrap excrement during clamping; a sleeve cover can be mounted outside the outer sleeve, such that the clamping jaw is prevented from being unfolded, and the excrement is prevented from falling off, and the device is portable; and the cleaning device has a compact overall structure, a small volume and a full function, and can be hung on a neck by means of a rope or wrapped on a pet body during daily walking, thereby greatly improving the convenience.

Figure 1:
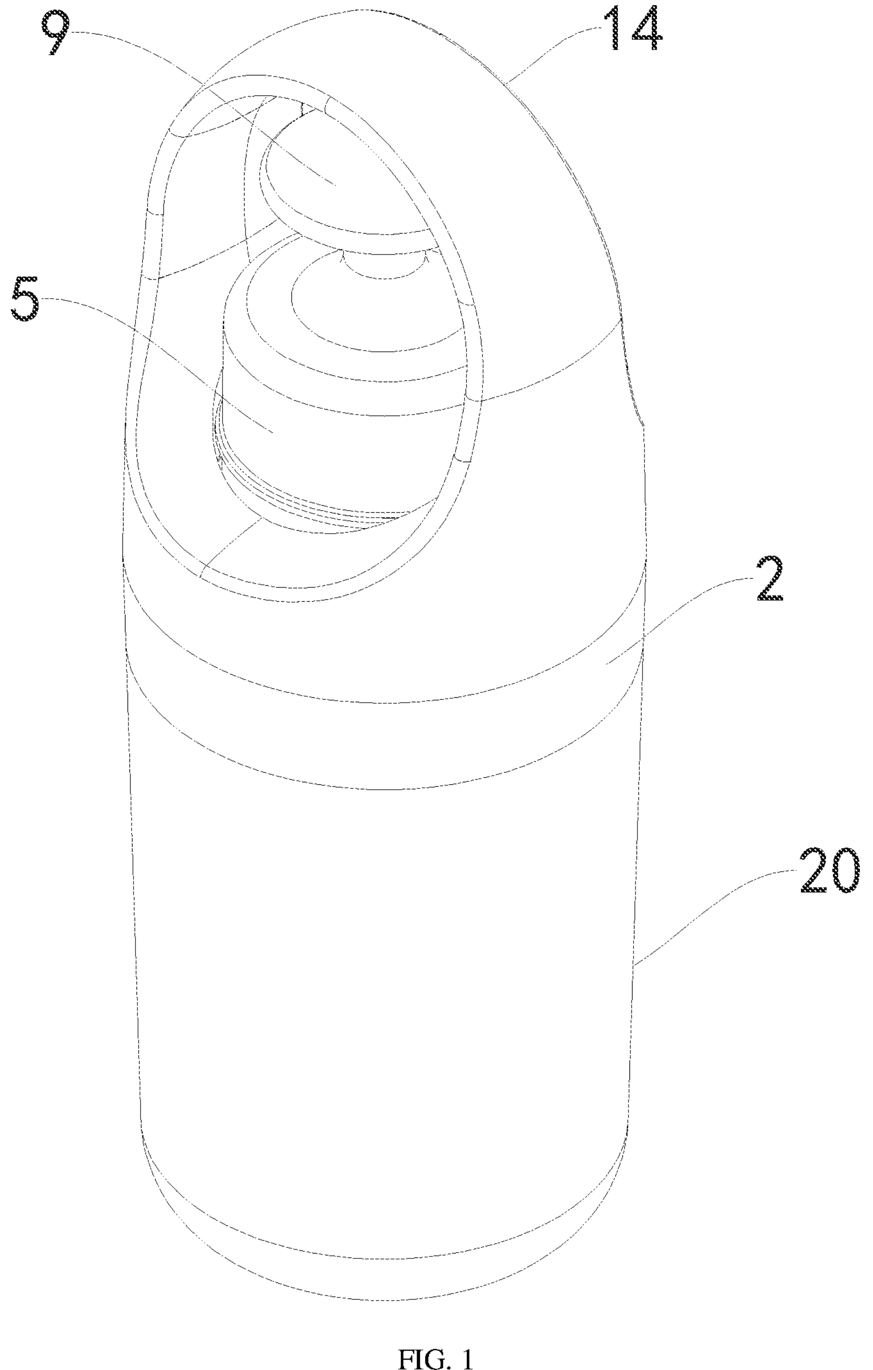
FIG. 1 is a first three-dimensional structural schematic view according to the present disclosure.

In the drawings: 1. inner sleeve; 2. outer sleeve; 3. guide block; 4. guide groove; 5. inner sleeve upper cover; 6. first connection groove; 7. connection block; 8. limiting ring; 9. pull handle; 10. first lug; 11. clamping jaw; 12. second lug; 13. connection rod; 14. lift handle; 15. external thread; 16. internal thread; 17. through-hole; 18. first push block; 19. second push block; 20. sleeve cover; 21. third connection groove; 22. third connection block; 23. spring; 24. pin shaft; 241. round cap; 242. conical cap; and 243. elastic groove.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person skilled in the art based on the embodiments of the present disclosure without creative efforts shall belong to the scope of protection of the present disclosure.

Figure 2:
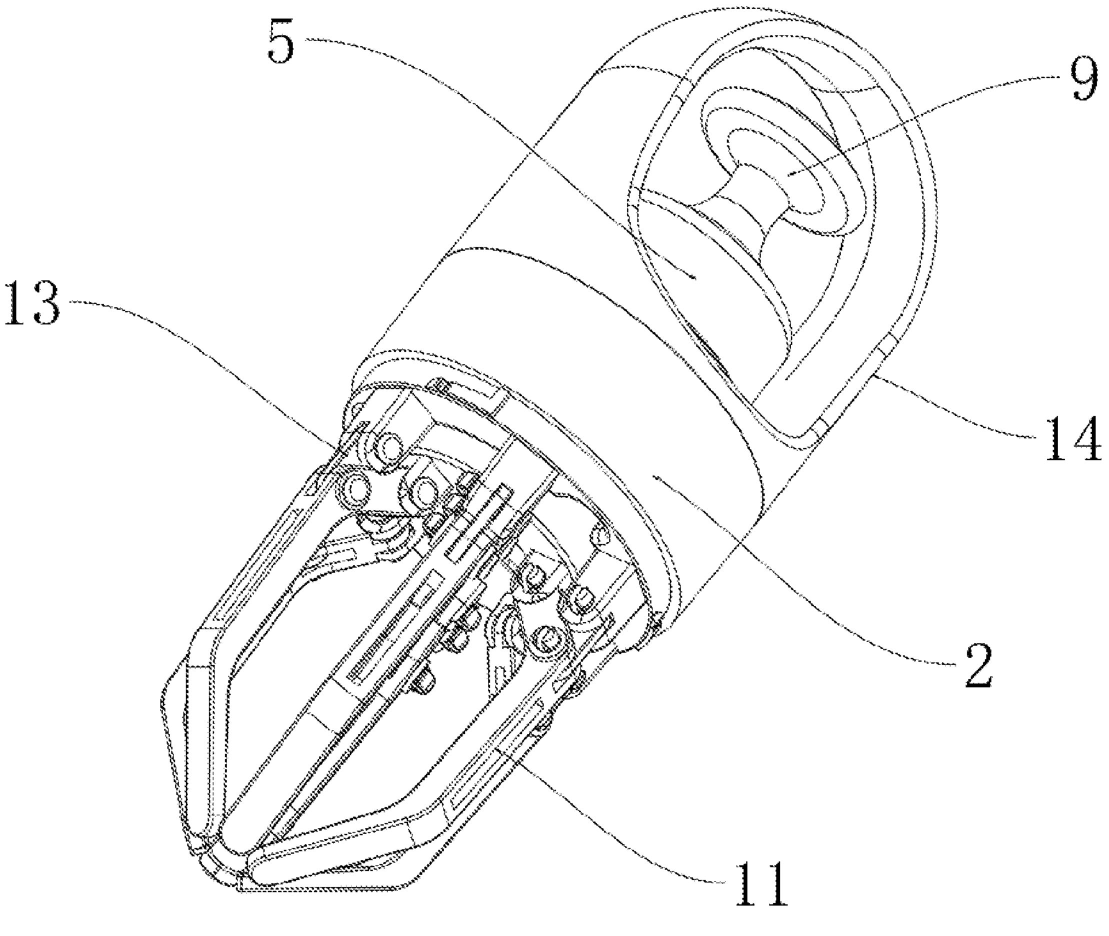
FIG. 2 is a second three-dimensional structural schematic view according to the present disclosure.
Figure 3:
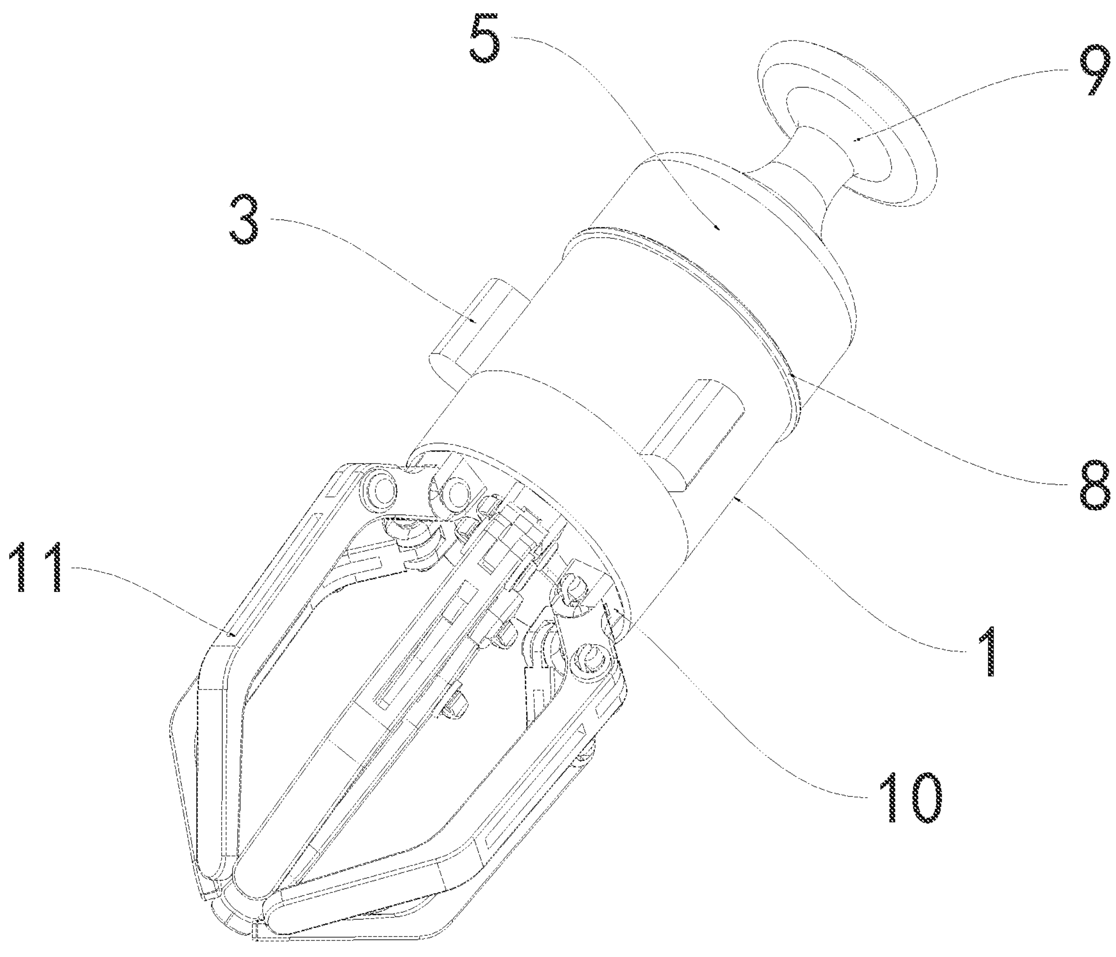
FIG. 3 is a three-dimensional structural schematic view of an inner sleeve, an inner sleeve upper cover and clamping jaws according to the present disclosure.
Figure 4:
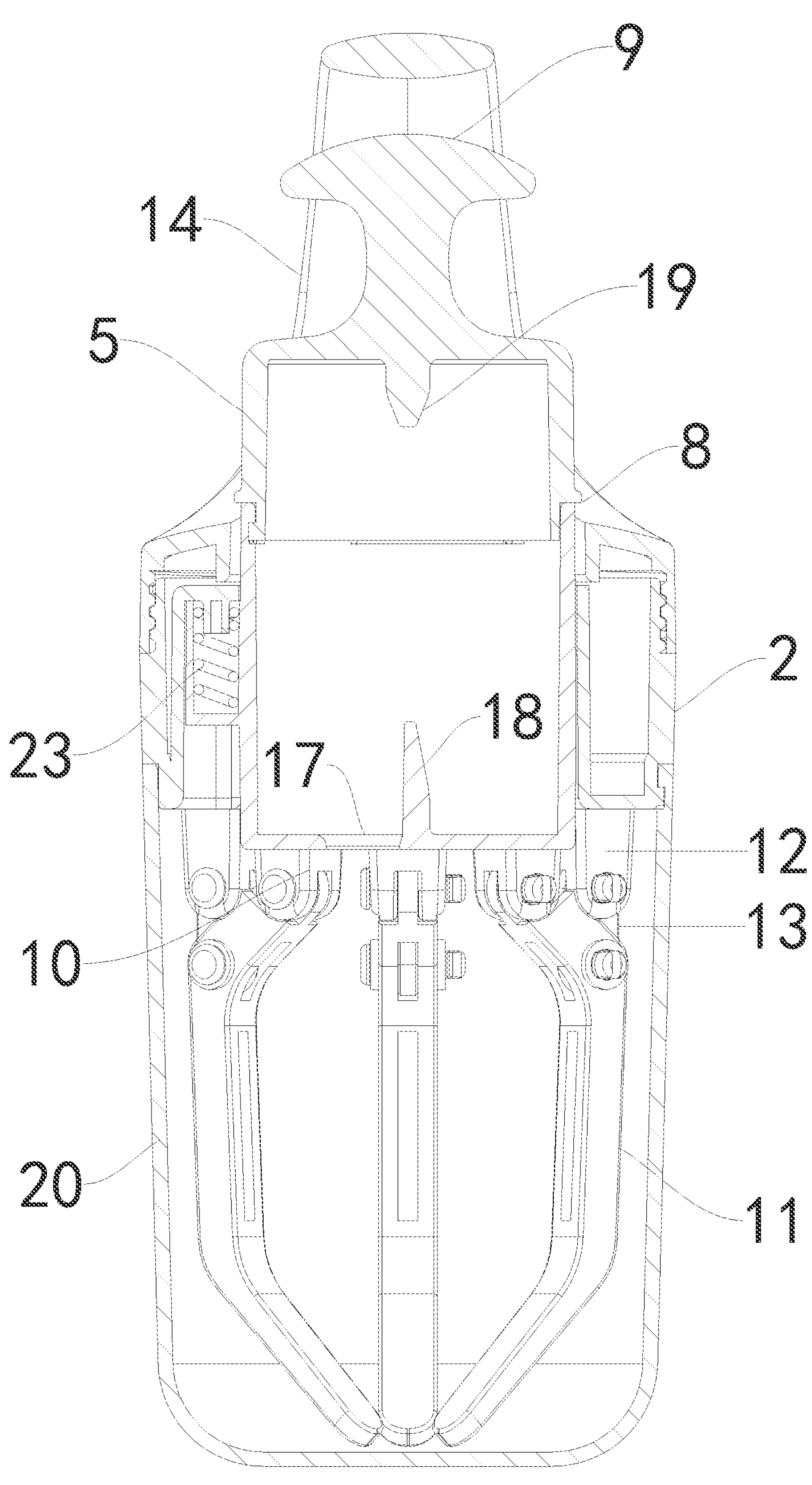
FIG. 4 is a cross-section structural schematic view of an outer sleeve according to the present disclosure.
Figure 5:
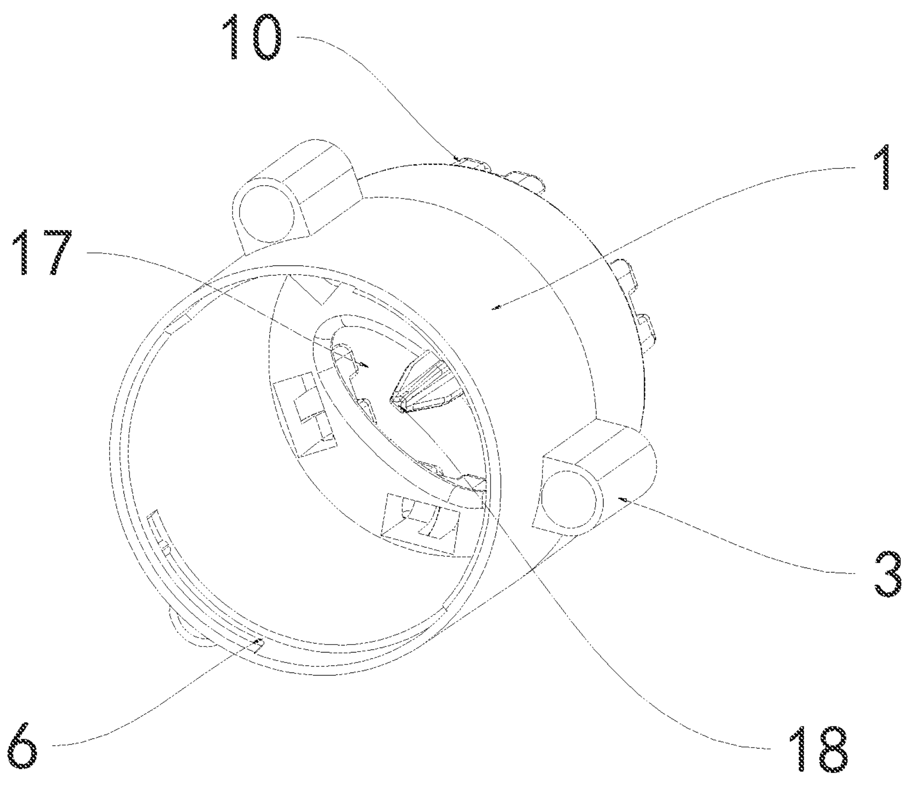
FIG. 5 is a three-dimensional structural schematic view of an inner sleeve according to the present disclosure.
Figure 6:
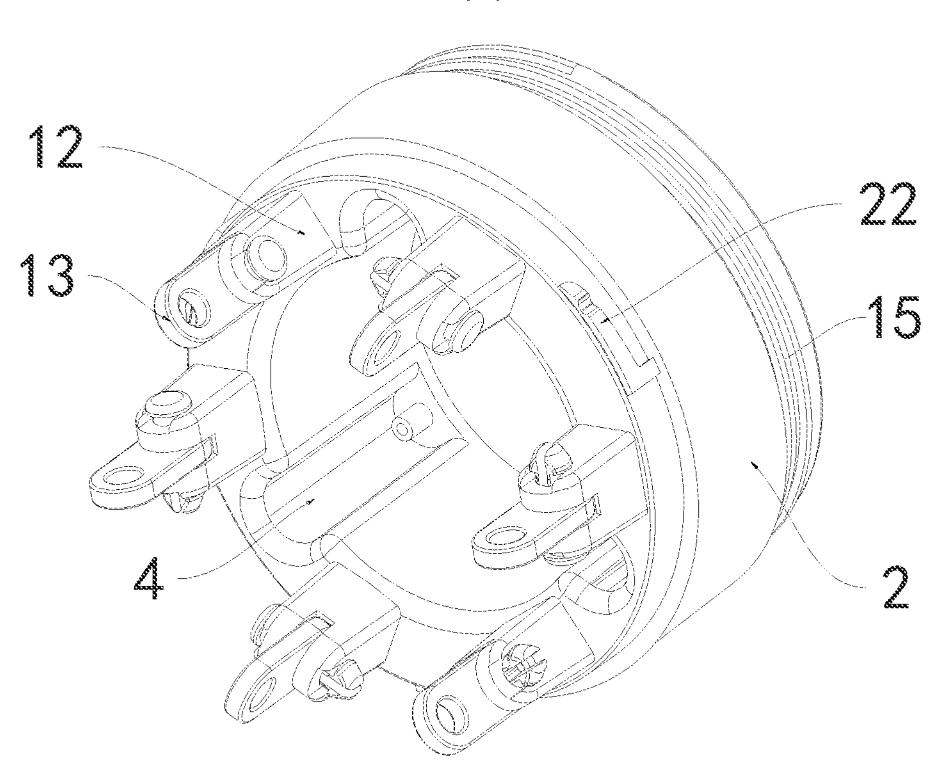
FIG. 6 is a three-dimensional structural schematic view of an outer sleeve according to the present disclosure.
Figure 7:
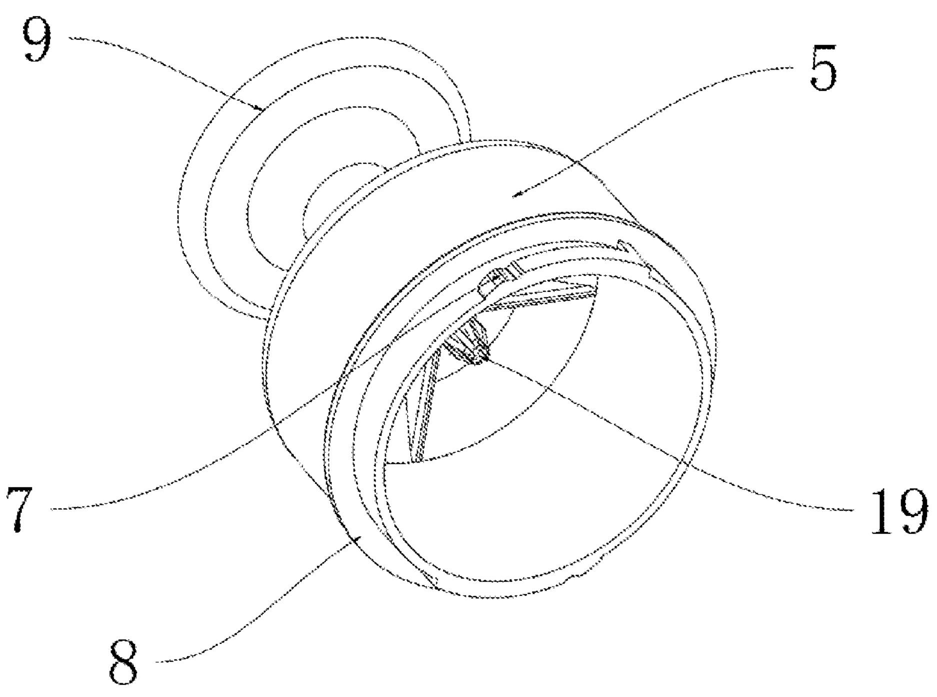
FIG. 7 is a three-dimensional structural schematic view of an inner sleeve upper cover according to the present disclosure.
Figure 8:
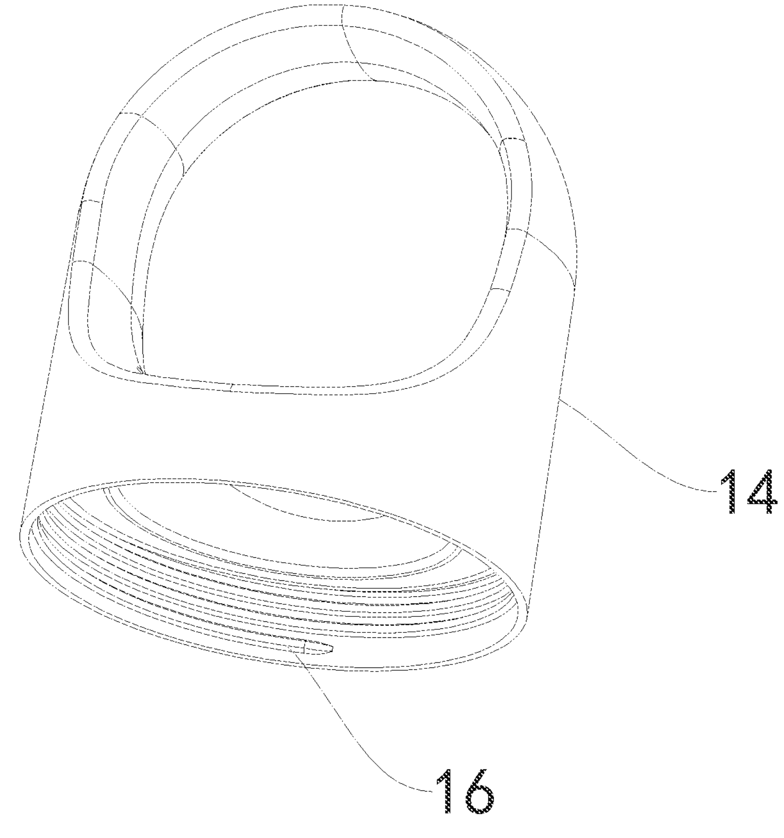
FIG. 8 is a three-dimensional structural schematic view of a lift handle according to the present disclosure.
Figure 9:
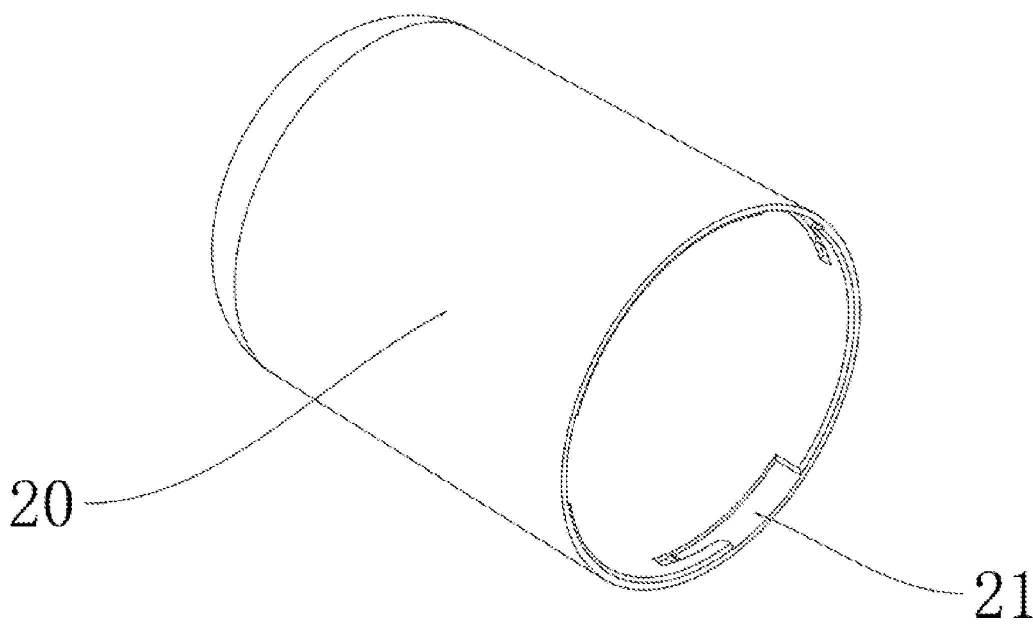
FIG. 9 is a three-dimensional structural schematic view of a sleeve cover according to the present disclosure.
Figure 10:
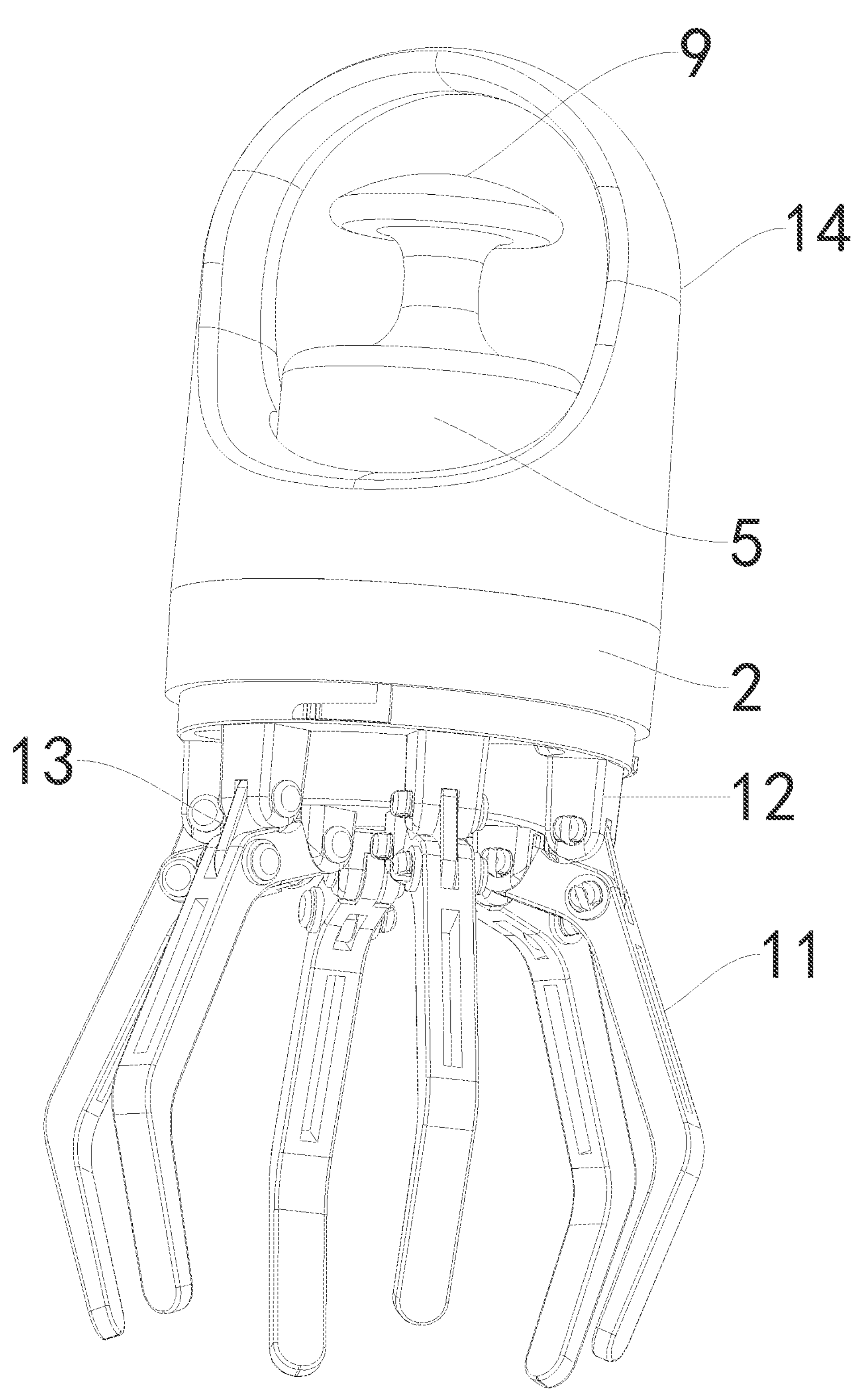
FIG. 10 is a structural schematic view of clamping jaws in an opening state of the present disclosure.
Figure 11:
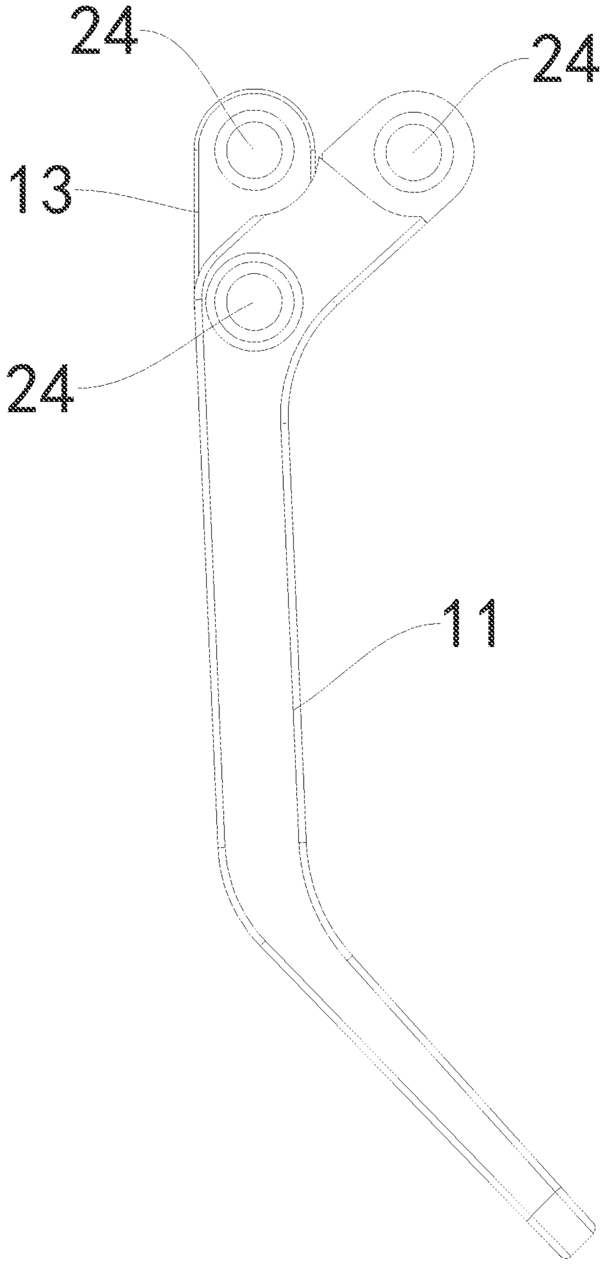
FIG. 11 is a schematic view of a clamping jaw, a connection rod and pin shafts in a connection state according to the present disclosure.
Figure 12:
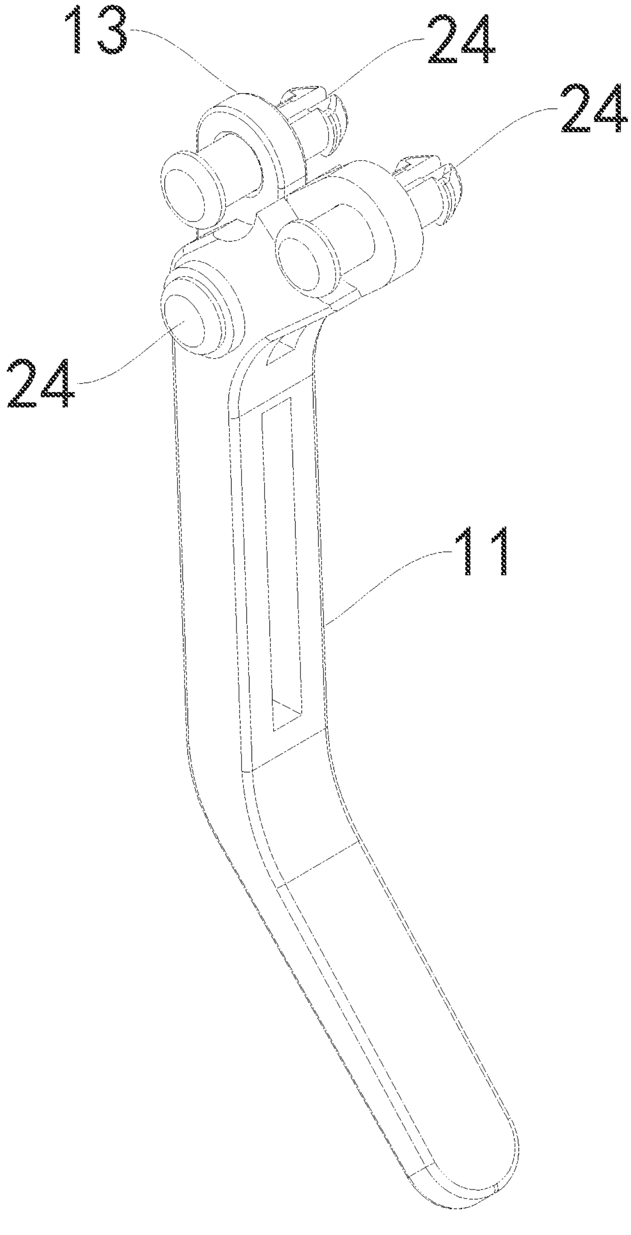
FIG. 12 is a perspective view of a clamping jaw, a connection rod and pin shafts in a connection state according to the present disclosure.
Figure 13:
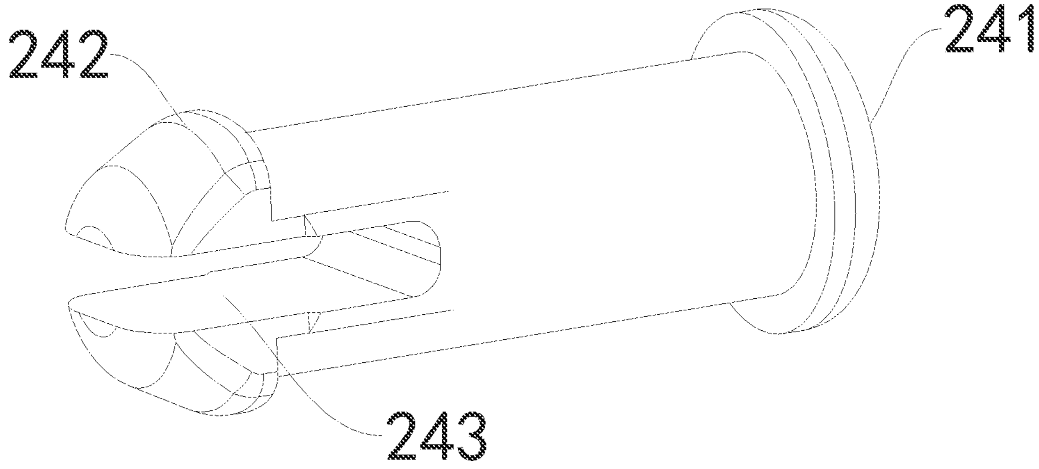
FIG. 13 is a three-dimensional structural schematic view of a pin shaft according to the present disclosure.
Figure 14:
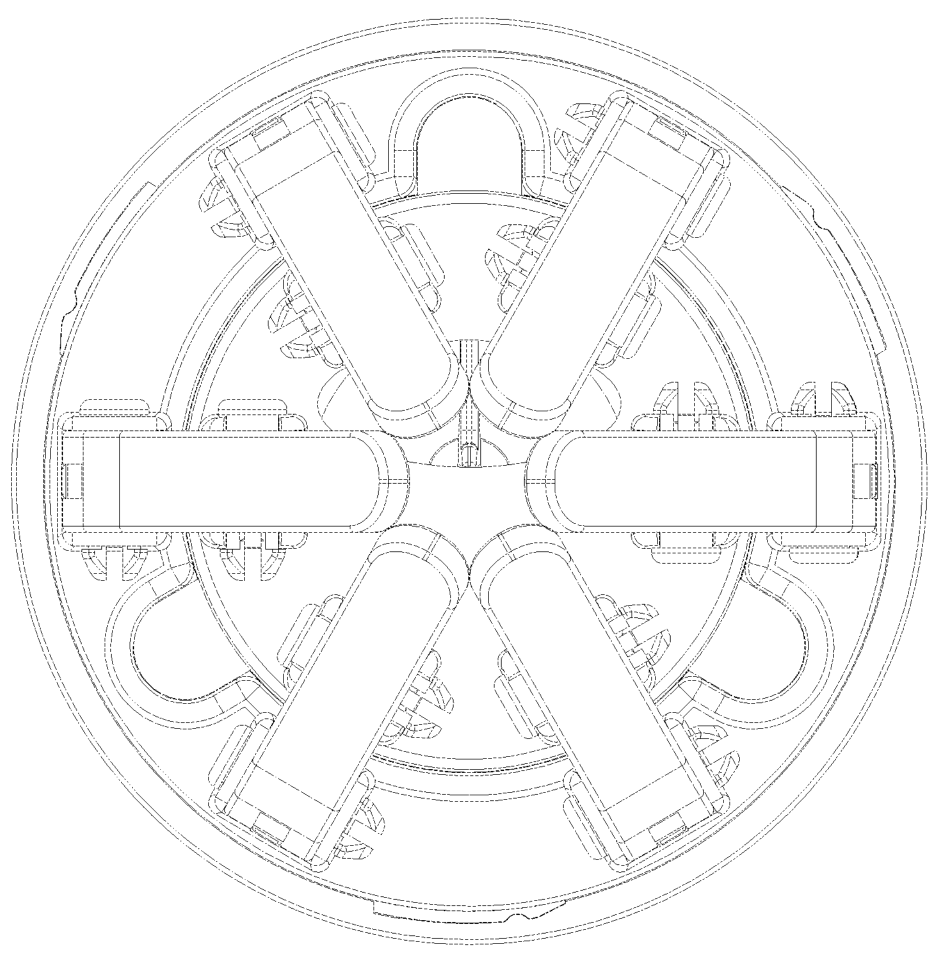
FIG. 14 is an overall bottom view according to the present disclosure.

Please refer to FIGS. 1-14, the present disclosure provides a technical solution: a pet excrement cleaning device, comprising an inner sleeve 1, wherein an outer sleeve 2 is provided on an outer side of the inner sleeve 1, guide blocks 3 are fixedly mounted on the outer side of the inner sleeve 1, guide grooves 4 are provided on an inner side of the outer sleeve 2, and the inner sleeve 1 is movably connected to the inner side of the outer sleeve 2. In the present embodiment, there are three guide blocks 3 annularly arranged with respect to a center line of the inner sleeve 1, and there are one, two or more than three guide blocks, the guide blocks 3 are fitted with an inner side of the guide grooves 4, the guide grooves 4 and the guide blocks 3 are in one-to-one correspondence, and springs 23 are sleeved inside the guide grooves 4. The inner sleeve 1 is capable of moving up and down in the outer sleeve 2, an inner sleeve upper cover 5 is capable of being detachably mounted on an upper end of the inner sleeve 1, first connection grooves 6 are provided on an inner side of the inner sleeve 1, first connection blocks 7 and a limiting ring 8 are provided on an outer side of the inner sleeve upper cover 5, the first connection grooves 6 has an L-shaped structure, there are two or more first connection grooves 6 annularly arranged. In the present embodiment, the inner sleeve 1 is connected to the inner sleeve upper cover 5 by means of the first connection blocks 7 and the first connection grooves 6 in a snap-fitting manner. Similarly, the inner sleeve 1 can also be connected to the inner sleeve upper cover 5 by other means, such as threads. The first connection blocks 7 and the first connection grooves 6 are in one-to-one correspondence, the limiting ring 8 is located on the side of the first connection blocks 7 away from the inner sleeve 1, and the diameter of the limiting ring 8 is larger than the inner diameter of the outer sleeve 2. A pull handle 9 is fixedly mounted on the end of the inner sleeve upper cover 5 away from the inner sleeve 1, and the pull handle 9 is provided on the top end of the inner sleeve upper cover 5 so as to facilitate pulling the inner sleeve upper cover 5 of and the inner sleeve 1 upwards with fingers. The inner sleeve 1 moves along the guide grooves 4 on the inner side of the outer sleeve 2 by means of the guide blocks 3, and the springs 23 reset the inner sleeve 1 by means of the guide blocks 3. The first connection blocks 7 of the inner sleeve upper cover 5 are aligned with the first connection grooves 6; after sleeved inside the inner sleeve 1, the inner sleeve upper cover 5 is rotated to enable the first connection blocks 7 to be snap-fitted inside the first connection grooves 6, so as to achieve the effect of fixing the inner sleeve 1 and the inner sleeve upper cover 5; after the inner sleeve 1 and the inner sleeve upper cover 5 are closed to form an accommodation cavity inside, so that the point-break garbage bag can be conveniently put into the inner sleeve 1; and the limiting ring 8 achieves the effect of limiting the inner sleeve 1, thereby preventing excessive displacement from the inner lower end of the outer sleeve 2 in a sliding process.

First lugs 10 are fixedly mounted on an end of the inner sleeve 1 away from the inner sleeve upper cover 5, clamping jaws 11 are rotatably mounted on an inner side of the first lugs 10, second lugs 12 is fixedly mounted on an end of the outer sleeve 2 close to the clamping jaws 11, connection rods 13 are rotatably mounted on an inner side of the second lugs 12. By providing the connection rods 13, when the inner sleeve 1 is pressed downward, the clamping jaws 11 have a larger opening angle, so that the apparatus can pick up larger excrement. In the present embodiment, there are six first lugs 10 annularly arranged with respect to the center line of the inner sleeve 1, and the clamping jaws 11 are in one-to-one correspondence with the first lugs 10. It should be noted that there are at least two clamping jaws, which can also meet the requirements of clamping operation. However, there are certain requirements for the width of clamping jaws. When the number of clamping jaws is small, the width of clamping jaws should be increased. Similarly, the number of clamping jaws can also be set to more than six, the other end of each of the connection rods 13 is rotatably connected to the inner side of each clamping jaw 11, and the connection rods 13 are in one-to-one correspondence with the clamping jaws 11. During the movement, the inner sleeve 1 drives one end of the clamping jaw 11 to swing around the centers of the two connection holes of the connection rod 13, so as to realize the grasping and unfolding actions of the clamping jaws 11.

A lift handle 14 is mounted on the upper end of the outer sleeve 2. In the present embodiment, an external thread 15 is provided on an outer side of the outer sleeve 2, and an internal thread 16 is provided on an inner side of the lift handle 14. The outer sleeve 2 is connected to the handle 14 by means of threads, and the fastener connection can also be used in the same way. A through-hole 17 is provided on the end of the bottom of the inner sleeve 1 close to the first lugs 10, which is used to pull out the point-break garbage bag downward. A first push block 18 is fixedly mounted inside the inner sleeve 1, a second push block 19 is fixedly mounted inside the inner sleeve upper cover 5, the through-hole 17 has an oval structure, and the first push block 18 and the second push block 19 are respectively located at the centers of a circle of the inner sleeve 1 and the lift handle 14; the first push block 18 and the second push block 19 are used to insert into the central circular hole of the point-break garbage bag, so as to facilitate the fixation thereof, and when the garbage bag is pulled down through the through-hole 17, the cylindrical garbage bag can rotate around the center of a circle of the first push block 18 and the second push block 19. A sleeve cover 20 is detachably mounted on the lower end of the outer sleeve 2, second connection grooves 21 are provided on the inner side of the sleeve cover 20, and second connection blocks 22 are fixedly provided on the outer side of the outer sleeve 2; the second connection grooves 21 have an L-shaped structure, there are three second connection grooves 21 arranged annularly, and there are also two or more than three second connection grooves; the second connection blocks 22 and the second connection grooves 21 are snap-fitted with each other, the second connection blocks 22 and the second connection grooves 21 are in one-to-one correspondence. Similarly, the sleeve cover 20 can also be connected to the outer sleeve 2 by other means, such as threads. The sleeve 20 is located outside the clamping jaws 11, the point-break garbage bag is put into the inner part of the inner sleeve 1 and the inner sleeve upper cover 5. The first push block 18 and the second push block 19 clamp and fix two ends of the garbage bag. The garbage bag is drawn out through the through-hole 17. The second connection grooves 21 of the sleeve cover 20 is aligned with the second connection blocks 22. After sleeved on the outer side of the outer sleeve 2, the sleeve cover 20 is rotated to enable the second connection blocks 22 to be snap-fitted with the second connection grooves 21, so as to achieve the effect of fixing the sleeve cover 20 and the outer sleeve 2, and the sleeve cover 20 achieves the effect of protecting the clamping jaws 11 and preventing the clamping jaws 11 from being unfolded, thereby preventing excrement in the garbage bag from falling off.

Each of the clamping jaws 11 is rotatably connected to a respective one of the first lug 10 by means of a pin shaft, each of the second lugs 12 is rotatably connected to an upper end of a respective one of the connection rods 13 by means of the pin shaft, and each of the clamping jaws 11 is rotatably connected to a lower end of a respective one of the connection rods 13 by means of the pin shaft; a round cap 241 is provided on one end of the pin shaft, and a conical cap 242 is provided on the other end of the pin shaft, and an elastic groove 243 is provided on one end of the conical cap 242; the lower end of each of the clamping jaws 11 is converged inward and bent; the arrangement of the elastic groove can facilitate the insertion and mounting of the pin shaft, and the pin shaft is simple to mount and is easy to operate; and after the clamping jaws are converged, the lower ends of the multiple clamping jaws are in a closed state, thereby preventing the clamped excrement from falling off.

The working principle is as follows: first, placing a point-break garbage bag into the inner sleeve 1, then sleeving the inner sleeve upper cover 5 inside the inner sleeve 1, aligning the first connection blocks 7 of the inner sleeve upper cover 5 with the first connection grooves 6, rotating the inner sleeve upper cover 5, so that the first connection blocks 7 are snap-fitted with the first connection grooves 6, thereby achieving the effect of fixing the inner sleeve 1 and the inner sleeve upper cover 5; by means of the first push block 18 and the second push block 19, clamping and fixing two ends of the garbage bag, the inner sleeve 1 moves along the guide grooves 4 at the inner side of the outer sleeve 2 by means of the guide blocks 3, and the limiting ring 8 achieves the effect of limiting the inner sleeve 1; then screwing the lift handle 14 with the outer sleeve 2 by means of the external thread 15 and the internal thread 16, thereby achieving the effect of fixing the lifting handle 14 and the outer sleeve 2; when using, taking down the sleeve cover 20, at this time, the clamping jaws 11 are open, drawing out the garbage bag through the through-hole 17, unfolding the garbage bag and covering it on the outside of the clamping jaws 11, then moving the clamping jaws 11 to excrement, so that the garbage bag can wrap the excrement, then pulling the pull handle 9 upward with your fingers to grasp by means of the clamping jaws 11, and the garbage bag will be folded and wrapped up with excrement; at this time, knotting the opening of the garbage bag, and then tearing off the broken point of the garbage bag, and throwing it a trash can; or when there is no trash can outdoors, the second connection grooves 21 of the sleeve cover 20 can be directly aligned with the second connection blocks 22 under the clamping state of the clamping jaws 11, and then the sleeve cover 20 can be rotated after sleeved on the outside of the outer sleeve 2, so that the second connection blocks 22 can be clamped in the second connection grooves 21, achieving the effect of fixing the sleeve cover 20 and the outer sleeve 2; and the sleeve cover 20 achieves the effect of limiting the clamping jaws 11, so that the camped excrement will not fall into the sleeve cover 20; after arriving at the treatment site, taking down the sleeve cover 20, opening the clamping jaws 11, and disposing the garbage bag so as to complete the cleaning operation. The cleaning device has a compact overall structure, a small volume and a full function, thereby greatly improving the convenience.

In the embodiments of the present application, description of directional terms such as "front", "back", "left" and "right" are merely described according to directions shown in the drawings shown in the present application, and are not limited to the scope of protection of the claims of the present application. During specific implementation, other same or similar implementations can be obtained by correspondingly modifying the embodiments, all of which belong to the scope of protection of the present application, and the present application does not repeat description of other similar or same implementations.

In the description of the present disclosure, it should be noted that, unless specified or limited otherwise, the terms "mounted", "connected", and "connecting" should be understood broadly, for example, may be fixed connections, detachable connections, or integral connections; may be mechanical connections, or electrical connections; may be direct connections, or indirect connections via intervening structures; and may be inner communications of two elements. A person skilled in the art may understand the specific meanings of the foregoing terms in the present disclosure according to specific situations.

Finally, it should be noted that, the foregoing content is only used to describe the technical solutions of the present disclosure rather than limit the scope of protection of the present disclosure, and person skilled in the art makes simple modifications or equivalent replacements to the technical solutions of the present disclosure without departing from the spirit and scope of the technical solutions of the present disclosure.

The invention claimed is:

1. A pet excrement cleaning device, comprising:

an inner sleeve (1);

an outer sleeve (2) provided on an outer side of the inner sleeve (1);

three guide blocks (3) annularly mounted on the outer side of the inner sleeve (1);

guide grooves (4) provided on an inner side of the outer sleeve (2) and the three guide blocks (3) on the inner sleeve engage guide grooves (4) on the outer sleeve;

springs (23) sleeved inside the guide grooves (4) bias the inner sleeve (1) relative to the outer sleeve (2);

an inner sleeve upper cover (5) mounted on an upper end of the inner sleeve (1);

first connection grooves (6) provided on an inner side of the inner sleeve (1);

first connection blocks (7) and a limiting ring (8) both provided on an outer side of the inner sleeve upper cover (5);

a pull handle (9) fixedly mounted on an end of the inner sleeve upper cover (5) away from the inner sleeve (1);

first lugs (10) fixedly mounted on an end of the inner sleeve (1) away from the inner sleeve upper cover (5);

clamping jaws (11) rotatably mounted on inner sides of the first lugs (10);

second lugs (12) fixedly mounted on an end of the outer sleeve (2) close to the clamping jaws (11);

connection rods (13) rotatably mounted on inner sides of the second lugs (12);

the clamping jaws (11) rotatably connected to lower ends of the connection rods (13); wherein linear movement of the inner sleeve (1) relative to the outer sleeve (2) drives the connection rods (13) to actuate the clamping jaws (11) to open and close;

a lift handle (14) mounted on the upper end of the outer sleeve (2);

an external thread (15) provided on an outer side of the outer sleeve (2);

an inner thread (16) provided on an inner side of the lift handle (14);

the outer sleeve (2) fixedly connected to the lift handle (14) by means of the outer thread (15) and the inner thread (16);

a through-hole (17) provided on one end of the inner sleeve (1) close to the first lugs (10);

a garbage bag retention structure including a first push block and a second push block configured to fix opposing ends of a garbage bag within the inner sleeve; the first push block (18) fixedly mounted inside the inner sleeve (1); the second push block (19) fixedly mounted inside the inner sleeve upper cover (5), wherein the first push block (18) and the second push block (19) are configured to clamp and fix two ends of the garbage bag and allow the garbage bag to be drawn out through the through-hole (17);

a sleeve cover (20) detachably mounted on a lower end of the outer sleeve (2);

second connection grooves (21) provided on an inner side of the sleeve cover (20);

second connection blocks (22) fixedly provided on the outer side of the outer sleeve (2); wherein the inner sleeve (1) is movably connected to the inner side of the outer sleeve (2), there are three third guide blocks (3) annularly arranged with respect to a center line of the inner sleeve (1), the guide blocks (3) are fitted with inner sides of the guide grooves (4), and the guide grooves (4) and the guide blocks (3) are in one-to-one correspondence;

the first connection grooves (6) have an L-shaped structure and cooperate with the first connection blocks (7)

and the limiting ring (8) to prevent the inner sleeve (1) from moving out of the outer sleeve (2);

there are two first connection grooves (6) annularly arranged, the first connection blocks (7) and the first connection grooves (6) are snap-fitted with each other, the first connection blocks (7) and the first connection grooves (6) are in one-to-one correspondence, the limiting ring (8) is located on the sides of the first connection blocks (7) away from the inner sleeve (1), and the diameter of the limiting ring (8) is larger than the inner diameter of the outer sleeve (2);

there are six first lugs (10) annularly arranged with respect to the center line of the inner sleeve (1); the clamping jaws (11) are in one-to-one correspondence with the first lugs (10), the other end of each of the connection rods (13) is rotatably connected to an inner side of a respective one of the clamping jaws (11), and the connection rods (13) are in one-to-one correspondence with the clamping jaws (11);

the through-hole (17) has an oval structure, and the first push block (18) and the second push block (19) are respectively located at centers of a circle of the inner sleeve (1) and the lift handle (14);

the second connection grooves (21) have an L-shaped structure, there are three second connection grooves (21) annularly arranged, the second connection blocks (22) and the second connection grooves (21) are snap-fitted with each other, the second connection blocks (22) and the second connection grooves (21) are in one-to-one correspondence, and the sleeve cover (20) is located outside the clamping jaws (11);

each of the clamping jaws (11) is rotatably connected to a respective one of the first lugs (10) by means of a pin shaft, each of the second lugs (12) is rotatably connected to the upper end of a respective one of the connection rods (13) by means of the pin shaft, and each of the clamping jaws (11) is rotatably connected to a lower end of a respective one of the connection rods (13) by means of the pin shaft;

a round cap (241) is provided on one end of the pin shaft, and a conical cap (242) is provided on the other end of the pin shaft, and an elastic groove (243) is provided on one end of the conical cap (242); and the lower end of each of the clamping jaws (11) is converged inward and bent.

2. The device of claim 1, wherein the three guide blocks (3) are annularly arranged around a circumference of the inner sleeve (1).

3. The device of claim 2, wherein the springs are configured to automatically return the inner sleeve after actuation.

4. The device of claim 3, wherein each connection rod is pivotally connected by a pin shaft.

5. The device of claim 4, wherein the through-hole is oval.

6. The device of claim 5, wherein the first push block and the second push block fix opposing ends of a garbage bag.

7. The device of claim 6, wherein the first connection grooves are L-shaped.

8. The device of claim 7, wherein the sleeve cover prevents the clamping jaws from unfolding.

9. The device of claim 8, wherein the clamping jaws have inwardly bent lower ends.

* * * * *